United States Patent
Park et al.

(10) Patent No.: US 11,092,360 B2
(45) Date of Patent: Aug. 17, 2021

(54) INTELLIGENT HEAT PUMP SYSTEM HAVING DUAL HEAT EXCHANGER STRUCTURE

(71) Applicant: J&G CO., LTD., Jeollabuk-do (KR)

(72) Inventors: Jong-woo Park, Jeollabuk-do (KR); Jeongsoo Shin, Gyeonggi-do (KR)

(73) Assignee: J&G CO., LTD., Jeonju-si (KR)

( * ) Notice: Subject to any disclaimer, the term of this patent is extended or adjusted under 35 U.S.C. 154(b) by 99 days.

(21) Appl. No.: 16/400,856

(22) Filed: May 1, 2019

(65) Prior Publication Data

US 2020/0278135 A1    Sep. 3, 2020

(30) Foreign Application Priority Data

Feb. 28, 2019  (KR) .................. 10-2019-0023749

(51) Int. Cl.
| | |
|---|---|
| *F24T 10/40* | (2018.01) |
| *F25B 30/02* | (2006.01) |
| *F24T 10/30* | (2018.01) |
| *F24T 50/00* | (2018.01) |
| *F25B 29/00* | (2006.01) |
| *F25B 30/06* | (2006.01) |

(52) U.S. Cl.
CPC .............. *F24T 10/40* (2018.05); *F24T 10/30* (2018.05); *F24T 50/00* (2018.05); *F25B 29/003* (2013.01); *F25B 30/02* (2013.01); *F25B 30/06* (2013.01); *F25B 2313/002* (2013.01); *F25B 2313/0213* (2013.01); *F25B 2313/0316* (2013.01)

(58) Field of Classification Search
CPC ...... F25B 2313/0316; F25B 2313/0213; F25B 2313/002; F25B 30/06; F25B 30/02; F25B 29/003; F24T 50/00; F24T 10/30; F24T 10/40
See application file for complete search history.

(56) References Cited

FOREIGN PATENT DOCUMENTS

| | | | |
|---|---|---|---|
| KR | 20110076527 A | * | 7/2011 |
| KR | 10-1265751 | | 5/2013 |
| KR | 10-1655664 | | 9/2016 |

OTHER PUBLICATIONS

KR-20110076527-A Translation (Year: 2011).*

* cited by examiner

*Primary Examiner* — Marc E Norman
*Assistant Examiner* — Schyler S Sanks
(74) *Attorney, Agent, or Firm* — Ladas & Parry, LLP (57) ABSTRACT

An intelligent heat pump system having a dual heat exchanger structure includes a heat source side heat exchange member, a heat pump, an external expansion valve, a refrigerant-water heat exchanger, a heat storage tank, and a target side end unit. A refrigerant flows through the heat pump, the refrigerant-water heat exchanger, and the target side end unit, and in a non-air-conditioning state for the target site, circulates between the heat pump and the refrigerant-water heat exchanger, so that cooled or heated water is stored in the heat storage tank. In an air-conditioning state for the target site, the heat pump and the heat storage tank supply cooling and heating to the target site, so that the power consumption for normal operation is reduced in order to improve the operation efficiency of the intelligent heat pump system.

4 Claims, 6 Drawing Sheets

INTELLIGENT HEAT PUMP SYSTEM HAVING DUAL HEAT EXCHANGER STRUCTURE

CROSS REFERENCE TO RELATED APPLICATION

The present application claims priority to Korean Patent Application Number 10-2019-0023749 filed on Feb. 28, 2019, the entire contents of which are incorporated herein for all purposes by this reference.

BACKGROUND

Field

The present disclosure relates to an intelligent heat pump system having a dual heat exchanger structure.

Description

A heat pump is a cooling/heating device that performs cooling by transferring low-temperature cold air on the heat source side to a target site using the heat or the condensation heat of a refrigerant, or transfers the high-temperature air on the heat source side to the target site. Currently, most heat pumps are structured to perform both cooling and heating functions.

As the heat source of such a heat pump, geothermal heat can be used. The heat pump system using the geothermal heat exchanges heat with the ground to absorb the geothermal heat or discharge heat to the ground, thereby performing cooling/heating function on, and supplying warm water and the like to the target site.

Examples of such heat pump systems using geothermal heat are those of the patent documents given below.

However, in conventional heat pump systems, although the power consumption required for normal operation should be reduced for improvement of operation efficiency, there is a limit in reducing the power consumption.

The information disclosed in the Background section is only provided for a better understanding of the background and should not be taken as an acknowledgment or any form of suggestion that this information forms prior art that would already be known to a person having ordinary skill in the art.

RELATED ART DOCUMENTS

Patent Document 1: Korean Patent Registration No. 10-1655664, registered on Sep. 1, 2016, titled "HEAT SOURCE-COMPENSATING GEOTHERMAL SYSTEM USING WATER TANK AND GEOTHERMAL SOURCE"

Patent Document 2: Korean Patent Registration No. 10-1265751, registered on May 13, 2013, titled "HIGH EFFICIENCY GEOTHERMAL HEAT PUMP SYSTEM USING HEAT EXCHANGE OF COOLING MEDIUM"

BRIEF SUMMARY

Various aspects of the present disclosure provide a heat pump system having a dual heat exchanger structure capable of reducing normal power consumption in order to improve operation efficiency.

According to an aspect, an intelligent heat pump system having a dual heat exchanger structure may include: a heat source side heat exchange member exchanging heat with a heat source while heat exchange water flows; a heat pump exchanging heat with the heat exchange water, which exchanged heat with the heat source through the heat source side heat exchange member, and operating in a cooling operation mode or a heating operation mode; an external expansion valve disposed outside of the heat pump to allow the refrigerant passed through the heat pump to expand while passing therethrough; a refrigerant-water heat exchanger through which the refrigerant passed through the external expansion valve exchanges heat; a heat storage tank storing water to exchange heat with the refrigerant while the water passes through the refrigerant-water heat exchanger; and a target side end unit capable of providing cooling and heating to a target site depending on the operation mode of the heat pump.

The refrigerant is able to flow between the heat pump, the refrigerant-water heat exchanger, and the target side end unit.

In a non-air-conditioning state for the target site, while the refrigerant is circulating between the heat pump and the refrigerant-water heat exchanger, the water is cooled or heated, and the cooled or heated water is stored in the heat storage tank.

The heat pump and the heat storage tank are able to supply cooling and heating to the target site in an air-conditioning state for the target site.

According to another aspect, an intelligent heat pump system having a dual heat exchanger structure may include: a heat source side heat exchange member exchanging heat with a heat source while heat exchange water flows; a heat pump exchanging heat with the heat exchange water, which exchanged heat with the heat source through the heat source side heat exchange member, and operating in a cooling operation mode or a heating operation mode, with a refrigerant circulating within the heat pump by closed circulation; a heat storage tank storing water to exchange heat with the refrigerant while the water passes through the heat pump; a heat storage supply piping allowing the heat exchange water directed from the heat source side heat exchange member toward the heat pump to be directed toward the heat storage tank; a heat storage reduction piping allowing the heat exchange water directed to the heat storage tank through the heat storage supply piping to be directed toward the heat pump; and a target side end unit capable of providing cooling and heating to a target site.

In a non-air-conditioning state for the target site, while the water, stored in the heat storage tank, is circulating between the heat storage tank and the heat pump, the water is cooled or heated, and the cooled or heated water is stored in the heat storage tank, and In an air-conditioning state for the target site, the water exchanges heat with the refrigerant while passing through the heat pump in a first heat-exchanging state in the heat source side heat exchange member and a second heat-exchanging state in the target site, the refrigerant exchanging heat with the water exchanges heat with the water flowing between the heat pump and the target side end unit in a state in which the refrigerant flows in the heat pump, whereby the cooling and heating is provided to the target site.

As set forth before, according to exemplary embodiments, the intelligent heat pump system having the dual heat exchanger structure includes the heat source side heat exchange member, the heat pump, the external expansion valve, the refrigerant-water heat exchanger, the heat storage tank, and the target side end unit. The refrigerant may flow through the heat pump, the refrigerant-water heat exchanger, and the target side end unit, and in the non-air-conditioning state for the target site, the refrigerant circulates between the heat pump and the refrigerant-water heat exchanger, and the cooled or heated water is stored in the heat storage tank, and in the air-conditioning state for the target site, the heat pump and the heat storage tank can supply cooling and heating to the target site, so that the power consumption required for normal operation can be reduced in order to improve the operation efficiency of the intelligent heat pump system.

Specifically, first, with the double heat exchange, it is possible to increase the coefficient of performance of the intelligent heat pump system by lowering the condensation temperature during cooling of the heat pump and raising the evaporation temperature during heating, thereby improving the performance of the intelligent heat pump system and reducing the power consumption.

Second, with the double heat exchange, it is possible to realize summer cold storage or winter heat storage during an extra non-air-conditioned time period such as nighttime, non-operation time, and so on, thereby reducing the power consumption of the intelligent heat pump system in the normal operation and enabling the demand management of the building or the power network through the reduction in the peak power, and preventing the black-out due to the power peak.

Third, even if the capacity of the heat storage tank can be held only for about 1 hour to 3 hours per day, it is possible to efficiently operate the intelligent heat pump system through intensive use of the heat storage tank at peak times of summer and winter.

Fourth, when the geothermal heat conductivity or the like is low so that the amount of heat exchange in the ground becomes insufficient, cold water (summer season) or warm water (winter season) in the heat storage tank can assist such situations. Thus, the number of the geothermal drilling holes or the size of the heat source side heat exchange member can be greatly reduced, thereby reducing the installation and operation costs of the intelligent heat pump system.

The methods and apparatuses of the present disclosure have other features and advantages that will be apparent from, or which are set forth in greater detail in the accompanying drawings, which are incorporated herein, and in the following Detailed Description of the Invention, which together serve to explain certain principles of the present disclosure.

DESCRIPTION OF THE DRAWINGS

The above and other objects, features, and advantages of the present disclosure will be more clearly understood from the following detailed description when taken in conjunction with the accompanying drawings, in which.

DETAILED DESCRIPTION

Hereinafter, an intelligent heat pump system having a dual heat exchanger structure will be described with reference to the accompanying drawings.

Figure 1:
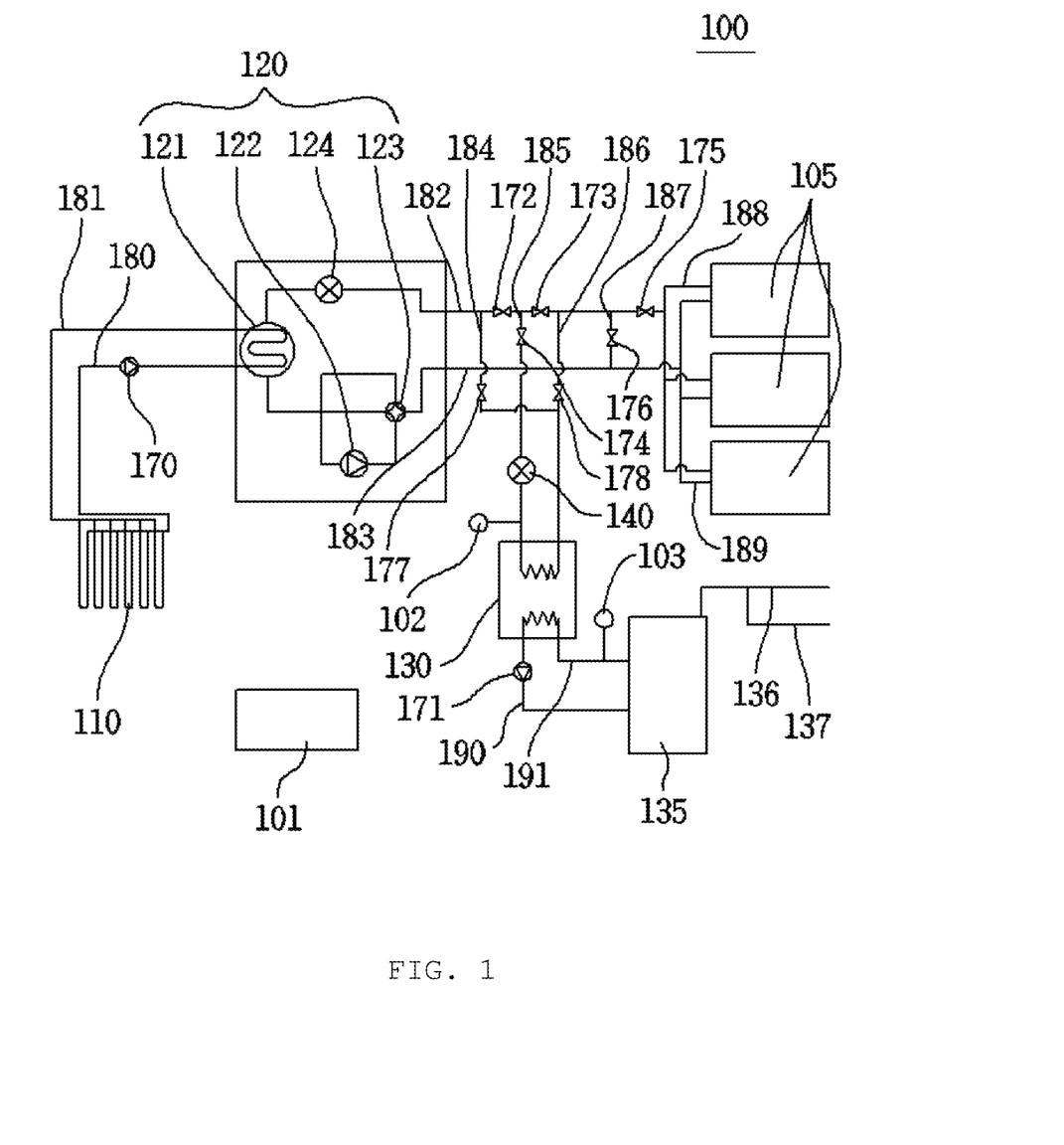
FIG. 1 is a view illustrating a configuration of an intelligent heat pump system having a dual heat exchanger structure according to a first exemplary embodiment.
Figure 2:
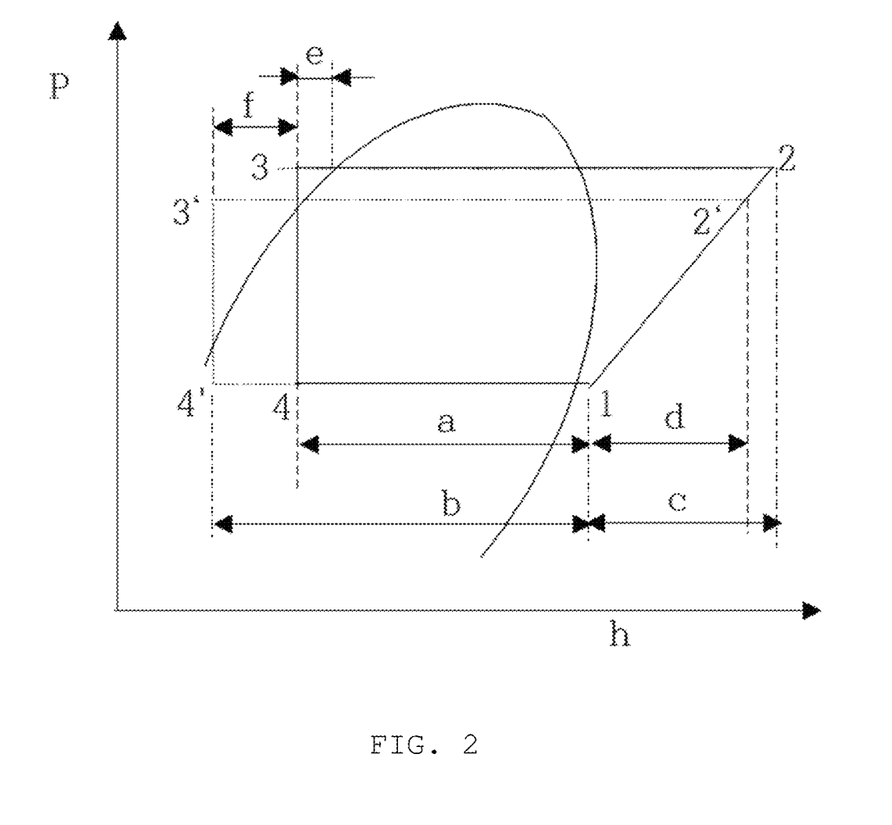
FIG. 2 is a P-h diagram of the intelligent heat pump system of the first embodiment during the cooling operation thereof.
Figure 3:
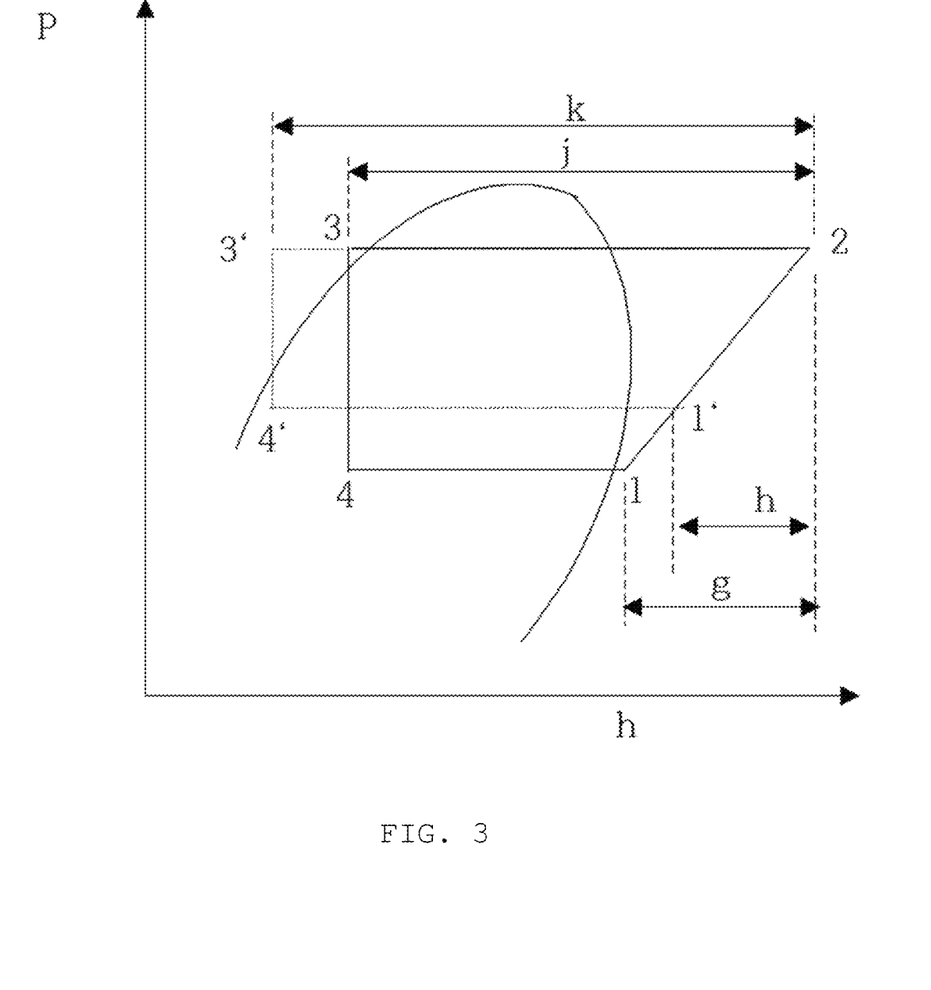
FIG. 3 is a P-h diagram of the intelligent heat pump system of the first exemplary embodiment during the heating operation thereof.

FIG. 1 is a view illustrating a configuration of an intelligent heat pump system having a dual heat exchanger structure according to a first exemplary embodiment, FIG. 2 is a P-h diagram of the intelligent heat pump system of the first embodiment during a cooling operation thereof, and FIG. 3 is a P-h diagram of the intelligent heat pump system of the first exemplary embodiment during a heating operation thereof.

Referring to FIGS. 1 to 3, the intelligent heat pump system 100 includes a heat source side heat exchange member 110, a heat pump 120, an external expansion valve 140, a refrigerant-water heat exchanger 130, a heat storage tank 135, and a demand side end unit 105.

The heat source side heat exchange member 110 exchanges heat with the heat source side while heat exchange water circulates therethrough. In the present embodiment, the heat source side heat exchange member 110 is buried in the ground and exchanges heat with the ground so that the heat exchange water exchanges heat with the ground via the heat source side heat exchange member 110.

Here, the heat source side heat exchange member 110 is illustrated as being a closed type.

Although the heat source has been illustrated as being a geothermal source in the present embodiment, the present disclosure is not limited thereto, and a heat source (an open type or a closed type heat source) that exchanges heat with the heat source side heat exchange member 110 may include various other heat sources such as ground water, lake water, river water, raw water, seawater, or water heat source and air heat source in a cooling tower or the like, waste heat source, etc.

Here, the closed type heat exchange member means a heat exchanger unit in which the heat exchange water only flows through the heat exchange member, heat-exchanging with the underground water without direct contact therewith.

The heat pump 120 exchanges heat with the water, which exchanged heat with the ground through the heat source side heat exchange member 110, and can operate in a cooling operation mode or a heating operation mode.

Here, the cooling operation mode means that the heat pump 120 is operated to supply a cooling medium to a target site, and the heating operation mode means that the heat pump 120 is operated to supply a heating medium to the target site.

Specifically, the heat pump 120 includes a heat source-side heat exchanger 121, a compressor 122, an internal expansion valve 124, and a four-way valve 123.

The heat source-side heat exchanger 121 is disposed on the side of the heat source side heat exchange member 110 so as to allow heat exchange between a cooling medium flowing through the heat pump 120 and the water flowing between the heat source side heat exchange member 110 and the heat pump 120.

Reference numeral 180 denotes a heat source supply piping in which the water, which exchanged heat with the ground via the heat source side heat exchange member 110, flows to the heat pump 120, here, the heat source-side heat exchanger 121. Reference numeral 181 denotes a heat source reduction piping in which the heat exchange water passed through the heat pump 120, here, the heat source-side heat exchanger 121, flows into the heat source side heat exchange member 110. Reference numeral 170 denotes a heat source pump that is installed in the heat source supply piping 180 for allowing the heat exchange water to flow between the heat source side heat exchange member 110 and the heat pump 120.

The compressor 122 serves to compress the refrigerant flowing in the heat pump 120.

The internal expansion valve 124 serves to allow the refrigerant flowing in the heat pump 120 to expand.

The four-way valve 123 serves to allow the flow direction of the refrigerant flowing in the heat pump 120 to be changed.

When the heat pump 120 is operated in the cooling operation mode, the heat source-side heat exchanger 121 functions as a condenser, so that the four-way valve 123 allows the cooling medium introduced from the outside of the heat pump 120 to flow sequentially through the compressor 122, the heat source-side heat exchanger 121, and the internal expansion valve 124.

In contrast, when the heat pump 120 is operated in the heating operation mode, the heat source-side heat exchanger 121 functions as an evaporator, so that the four-way valve 123 allows the cooling medium introduced from the outside of the heat pump 120 to flow sequentially through the internal expansion valve 124, the heat source-side heat exchanger 121, and the compressor 122.

The external expansion valve 140 is disposed outside of the heat pump 120 so that the refrigerant passed through the heat pump 120 can expand while passing through the external expansion valve.

In the present embodiment, the external expansion valve 140 is disposed between the heat pump 120 and the refrigerant-water heat exchanger 130.

The refrigerant-water heat exchanger 130 exchanges heat between the refrigerant and water flowing from the heat storage tank 135 while the refrigerant passes through heat exchanger 130 via the external expansion valve 140.

Reference numeral 182 denotes an inner extension piping extending from the internal expansion valve 124 of the heat pump 120 toward the target-side end unit 105.

Reference numeral 185 denotes a heat exchange branch piping branching from the inner extension pipe 182 and extending to the refrigerant-water heat exchanger 130. The external expansion valve 140 is installed on the heat exchange branch piping 185.

Reference numeral 174 denotes an opening/closing valve for opening/closing the heat exchange branch piping 185.

Reference numeral 102 denotes an incoming refrigerant temperature sensor that senses the temperature of the refrigerant flowing into the refrigerant-water heat exchanger 130 via the external expansion valve 140 along the heat exchange branch piping 185.

Reference numeral 186 denotes a heat exchange joint piping extending from the refrigerant-water heat exchanger 130 and joined to the inner extension pipe 182 to allow the refrigerant passed through the refrigerant-water heat exchanger 130 to flow toward the inner extension piping 182.

Reference numeral 184 denotes a branched joint piping branching from the heat exchange joint piping 186 and joined between a branch point of the heat exchange branch piping 185 and the internal expansion valve 124 along the inner extension piping 182.

Reference numeral 177 denotes an opening/closing valve for opening and closing the branched joint piping 184.

The target-side end unit 105 can provide cooling and heating to a target site depending on the operation mode of the heat pump 120. An indoor unit of an air conditioner may be given as an example.

Reference numeral 188 denotes a target side supply piping for connecting the end of the inner extension piping 182 and the target-side end unit 105.

Reference numeral 183 denotes a water-returning connection piping extending from a target side water-returning piping 189 to be described later and connected to the four-way valve 123 of the heat pump 120.

Reference numeral 189 denotes a target side water-returning piping connecting the target-side end unit 105 and the water-returning connection piping 183.

The target side supply piping 188 and the target side water-returning piping 189 may have the same number as the number of the target-side end units 105, respectively.

Reference numeral 187 denotes a bridge piping connecting a portion between the junction point of the heat exchange joint piping 186 and the water-returning connection piping 183 in the inner extension piping 182 and the water-returning connection piping 183.

Reference numeral 176 denotes an opening/closing valve for opening/closing the bridge piping 187.

Reference numeral 172 denotes an opening/closing valve for opening/closing a portion between the junction point of the joint piping 184 of the inner extension piping 182 and the branched point of the branch piping 185 of the inner extension piping 182.

Reference numeral 173 denotes an opening/closing valve for opening and closing a portion between the branch point of the heat exchange branch piping 185 and the junction point of the heat exchange joint piping 186 in the inner extension piping 182.

Reference numeral 175 denotes an opening/closing valve for opening and closing a portion between a connection point of the bridge piping 187 and the target side supply piping 188 in the inner extension piping 182.

Reference numeral 178 denotes an opening/closing valve for opening and closing the branch point of the joint piping 184 of the heat exchange joint piping 186 and the junction point between the joint piping 186 and the inner extension piping 182.

The heat storage tank 135 stores the water that was heated or cooled by heat exchange with the refrigerant during passing via the refrigerant-water heat exchanger 130.

Reference numeral 136 denotes a drinking water supply piping for supplying drinking water (for example, tap water) that a person can drink to the heat storage tank 135 from a water source such as an external water source. Reference numeral 137 denotes a rainwater supply piping for supplying rainwater to the heat storage tank 135.

According to these configurations, when the water becomes insufficient in the heat storage tank 135 as the operating time elapses, drinking water, rainwater, recycled water (heavy water) and the like can be utilized. In particular, in the case of rainwater, recycled water and the like being used, the energy (temperature difference energy) of the waste material is recycled, so that the effective resources of the discarded material and energy can be recycled.

When rainwater, recycled water, and the like are reused, rainwater, recycled water, and the like are supplied to the heat storage tank 135 via a strainer as a special filter so that the water quality in the heat storage tank 135 is maintained at a required level. In addition, a cleaning unit into which a cleaning tool can be inserted is formed in a lower part of the heat storage tank 135, so that the heat storage tank 135 can be easily cleaned and maintained.

Reference numeral 191 denotes a water supply piping connecting the storage tank 135 and the refrigerant-water heat exchanger 130 to allow the water in the storage tank 135 to flow to the refrigerant-water heat exchanger 130. Reference numeral 190 denotes a water-returning piping through which the water passed through the refrigerant-water heat exchanger 130 is returned to the storage tank 135. Referenced numeral 171 denotes a heat storage pump provided on the water-returning piping 190 to allow the water to circulate via the refrigerant-water heat exchanger 130 and the storage tank 135.

Reference numeral 103 denotes a temperature sensor for sensing the temperature of the water flowing into the refrigerant-water heat exchanger 130 from the storage tank 135.

Reference numeral 101 denotes a controller capable of controlling the operation of each component of the intelligent double heat exchange type heat pump system 100.

In the present embodiment, the refrigerant can flow between the heat pump 120, the refrigerant-water heat exchanger 130 disposed on the outside of the heat pump 120, and the target side end unit 105. The refrigerant directed from the heat pump 120 to the refrigerant-water heat exchanger 130 may pass through the external expansion valve 140.

In the present embodiment, while the refrigerant circulates between the heat pump 120 and the refrigerant-water heat exchanger 130 in a non-air-conditioning state for the target site, the cooled or heated water is stored in the storage tank 135. The heat pump 120 and the heat storage tank 135 can supply cooling and heating to the target site in an air-condition condition with respect to the target site.

Here, the non-air-conditioning state means a state in which a current period of time is not air-conditioned with the target site, such as nighttime or non-operating time.

Hereinafter, the operation of the intelligent heat pump system 100 having the dual heat exchanger structure according to the present embodiment will be described in detail with reference to the drawings.

First, a cold storage operation of the heat pump system 100 will be described.

If the heat pump 120 is in the cooling operation mode and in the non-air-conditioning state for the target site, the cold storage operation is performed. In this case, the opening/closing valve 172 is opened, the opening/closing valve 173 is closed, the opening/closing valve 175 is closed, the opening/closing valve 176 is opened, the opening/closing valve 174 is opened, the opening/closing valve 178 is opened, and the opening/closing valve 177 is closed.

In this state, when the heat source pump 170 and the heat storage pump 171 are operated, the refrigerant that has exchanged heat with the heat exchange water in the heat source side heat exchanger 121 of the heat pump 120 expands while passing through the internal expansion valve 124 and then flows through the inner extension piping 182 and the branch piping 185. In this process, the refrigerant flows through the refrigerant-water heat exchanger 130 in an expanded state obtained during passing through the external expansion valve 140.

As described above, the refrigerant passing through the refrigerant-water heat exchanger 130 absorbs the heat of the water passing through the refrigerant-water heat exchanger 130, and flows through the heat exchanging joint piping 186, the inner extension piping 182, the bridge piping 187 and the water-returning connection piping 183 and then flows again into the four-way valve 123 of the heat pump 120, thereby providing the circulation of the refrigerant.

In addition, the heat-exchanged water that absorbs the heat of the refrigerant in the heat pump 120 flows through the heat source reduction piping 181, and then flows again into the heat pump 120 through the heat source supply piping 180 in a heat-lost state obtained during heat exchange with the ground at the heat source side heat exchange member 110, thereby providing the circulation of the heat exchange water.

In addition, the water heat-lost by the refrigerant in the refrigerant-water heat exchanger 130 is stored in the heat storage tank 135 through the water-returning piping 190 in a cooled state, so that the cold storage operation is performed.

Hereinafter, the cold air supply operation of the intelligent heat pump system 100 will be described.

When the heat pump 120 is in the cooling operation mode and in the air-conditioning state for the target site, the cold air supply operation proceeds. In this case, the opening/closing valve 172 is opened, the opening/closing valve 173 is closed, the opening/closing valve 175 is opened, the opening/closing valve 176 is closed, the opening/closing valve 174 is opened, the opening/closing valve 178 is opened, the opening/closing valve 177 is closed, and the internal expansion valve 124 and the external expansion valve 140 are completely opened so that the refrigerant passes therethrough without expansion.

In this state, when the heat source pump 170 and the heat storage pump 171 are operated, the refrigerant that has lost heat and has been first-condensed through the heat exchange with the water in the heat source side heat exchanger 121 flows through the internal expansion valve 124, the inner extension piping 182, the branch piping 185, and then the refrigerant-water heat exchanger 130.

As described above, the refrigerant passed through the refrigerant-water heat exchanger 130 loses heat and is second-condensed through the heat exchange with the cooled water supplied from the heat storage tank 135 via the refrigerant-water heat exchanger 130. Then, the refrigerant flows into the target site through the heat exchange joint piping 186, the inner extension piping 182, the target side supply piping 188, and the target side end unit 105. In this manner, the cold air supply operation is performed.

As described above, the refrigerant passed through the target side end unit 105 flows through the target side water-returning piping 189 and the water-returning connection piping 183, and then flows into the four-way valve 123 of the heat pump 120, thereby providing the circulation of the refrigerant.

In addition, the heat exchange water that absorbed the heat of the refrigerant in the heat pump 120 flows through the heat source reduction piping 181, and then flows again into the heat pump 120 through the heat source supply piping 180 in a heat-lost state obtained through the heat exchange with the ground in the heat source side heat exchange member 110, thereby providing the circulation of the heat exchange water.

As described above, by performing the above cold storage and cold air supply operations in the intelligent heat pump system 100, as illustrated in FIG. 2, the refrigerant circulates through 1-2'-3'-4' in the present embodiment, rather than conventionally through 1-2-3-4, whereby the supercooled degree is increased from the conventional case e to the present case f, and the cooling performance, which is the evaporation capacity, is increased from the conventional case a to the present case b, and the power consumption of the compressor 122 is reduced to the present case d from the conventional case c, thereby increasing the coefficient of performance of the intelligent heat pump system 100 and thus reducing the energy required for cooling.

In addition, when the amount of heat exchange with the ground is insufficient, the cooled water stored in the heat storage tank 135 can support the insufficient amount of heat exchange with the ground, so that the number of the geothermal drilling holes or the size of the heat source side heat exchange member 110 can be greatly reduced, thereby reducing the installation and operation costs of the intelligent heat pump system 100.

In addition, the controller 101 automatically turns on/off each of the opening/closing valves, the expansion valves, and the like. Further, the controller also compares the temperature T1 of the refrigerant flowing into the refrigerant-water heat exchanger 130, which is sensed by the temperature sensor 102, and the temperature T2 of the water flowing into the refrigerant-water heat exchanger 130 from the storage tank 135, which is sensed by a temperature sensor 103, and if "T1≤T2+α" (where α is a cooling correction value for correcting measurement deviation, summer heat acquisition, uneven flowing or the like), returns the operation to a normal operation, that is, the operation that does not use the water in the storage tank 135. In such a condition, the cooling effect of the water in the storage tank 135 is eliminated. Then, the refrigerant flows through the inner extension piping 182, the target side supply piping 188, the target side water-returning piping 189 and the water-returning connection piping 183, thereby repeating a conventional short cycle of flowing between the heat pump 120 and target side end unit 105.

Here, the opening/closing valve 172 is opened, the opening/closing valve 173 is opened, the opening/closing valve 175 is opened, the opening/closing valve 176 is closed, the opening/closing valve 174 is closed, the opening/closing valve 178 is closed, and the opening/closing valve 177 is closed.

Hereinafter, the heat storage operation of the heat pump system 100 will be described.

If the heat pump 120 is in the heating operation mode and in the non-air-conditioning state for the target site, the heat storage operation is performed. In this case, the opening/closing valve 172 is closed, the opening/closing valve 173 is opened, the opening/closing valve 175 is closed, the opening/closing valve 176 is opened, the opening/closing valve 174 is opened, the opening/closing valve 178 is closed, and the opening/closing valve 177 is opened.

In this state, when the heat source pump 170 and the heat storage pump 171 are operated, the refrigerant that has obtained heat and evaporated through heat exchange with the heat exchange water in the heat source side heat exchanger 121 of the heat pump 120 is compressed while passing through the compressor 122 and then flows to the refrigerant-water heat exchanger 130 through the water-returning connection piping 183, the bridge piping 187, the inner extension piping 182 and the branch piping 185.

In this process, since the external expansion valve 140 is completely opened, the refrigerant does not expand in the external expansion valve 140.

The refrigerant passed through the refrigerant-water heat exchanger 130 as described above loses heat to the water passing through the refrigerant-water heat exchanger 130, and flows through the heat exchanging joint piping 186, the joint piping 184, and the inner extension piping 182. Then, the refrigerant flows again into the internal expansion valve 124 of the heat pump 120 so that it expands, and then flows again into the heat source side heat exchanger 121, thereby providing the circulation of the refrigerant.

In addition, the heat-exchanged water that lost heat to the refrigerant in the heat pump 120 flows through the heat source reduction piping 181, and then flows again into the heat pump 120 through the heat source supply piping 180 in a heated state obtained during heat exchange with the ground at the heat source side heat exchange member 110, thereby providing the circulation of the heat exchange water.

In addition, the water heat-obtained from the refrigerant in the refrigerant-water heat exchanger 130 is stored in the heat storage tank 135 through the water-returning piping 190 in a heated state, so that the heat storage operation is performed.

Hereinafter, the heat supply operation of the intelligent heat pump system 100 will be described.

When the heat pump 120 is in the heating operation mode and in the air-conditioning state for the target site, the heat supply operation proceeds. In this case, the opening/closing valve 172 is closed, the opening/closing valve 173 is opened, the opening/closing valve 175 is opened, the opening/closing valve 176 is closed, the opening/closing valve 174 is opened, the opening/closing valve 178 is closed, and the opening/closing valve 177 is opened.

In this state, when the heat source pump 170 and the heat storage pump 171 are operated, the refrigerant that was condensed through the target side end unit 105 flows into the refrigerant-water heat exchanger 130 through the target side supply piping 188, the inner extension piping 182, and the branch piping 185.

Here, the refrigerant expands while passing through the external expansion valve 140.

The refrigerant passed through the refrigerant-water heat exchanger 130 as described above is heated and first-evaporated through the heat exchange with the heated water supplied from the heat storage tank 135. Then, the refrigerant flows again into the internal expansion valve 124 of the heat pump 120 through the heat exchange joint piping 186, the joint piping 184, and the inner extension piping 182, and then is heated and second-evaporated through the heat exchange with the heat exchange water while passing through the heat source side heat exchanger 121.

Here, since the internal expansion valve 124 is completely opened, the refrigerant does not expand.

The refrigerant second-evaporated as described above is compressed via the compressor 122, and flows again into the target side end unit 105 via the water-returning connection piping 183 and the target side water-returning piping 189, so that the heat supply operation providing heating to the target site through the target side end unit 105 is performed.

As described above, by performing the above heat storage and heat supply operations in the intelligent heat pump system 100, as illustrated in FIG. 3, the refrigerant circulates through 1'-2-3'-4' in the present embodiment, rather than conventionally through 1-2-3-4, whereby the power consumption of the compressor 122 is reduced to the present case h from the conventional case g, and the heating performance, which is the condensation capacity, is increased from the conventional case j to the present case k, thereby increasing the coefficient of performance of the intelligent heat pump system 100 and thus reducing the energy required for heating.

In addition, when the amount of heat exchange with the ground is insufficient, the heated water stored in the heat storage tank 135 can support the insufficient amount of heat exchange with the ground, so that the number of the geothermal drilling holes or the size of the heat source side heat exchange member 110 can be greatly reduced, thereby reducing the installation and operation costs of the intelligent heat pump system 100.

In addition, the controller 101 automatically turns on/off each of the opening/closing valves, the expansion valves, and the like. Further, the controller also compares the temperature T1 of the refrigerant flowing into the refrigerant-water heat exchanger 130, which is sensed by the temperature sensor 102, and the temperature T2 of the water flowing into the refrigerant-water heat exchanger 130 from the storage tank 135, which is sensed by a temperature sensor 103, and if "T1≥T2+β" (where β is the heating correction value for correcting measurement deviation, winter heat loss, uneven flowing or the like), returns the operation to a normal operation, that is, the operation that does not use the water in the storage tank 135. In such a condition, the heating effect of the water in the storage tank 135 is eliminated. Then, the refrigerant flows through the inner extension piping 182, the target side supply piping 188, the target side water-returning piping 189 and the water-returning connection piping 183, thereby repeating a conventional short cycle of flowing between the heat pump 120 and target side end unit 105.

Here, the opening/closing valve 172 is opened, the opening/closing valve 173 is opened, the opening/closing valve 175 is opened, the opening/closing valve 176 is closed, the opening/closing valve 174 is closed, the opening/closing valve 178 is closed, and the opening/closing valve 177 is closed.

As described above, the intelligent heat pump system 100 having the dual heat exchanger structure includes the heat source side heat exchange member 110, the heat pump 120, the external expansion valve 140, the refrigerant-water heat exchanger 130, the heat storage tank 135 and the target side end unit 105. The refrigerant may flow through the heat pump 120, the refrigerant-water heat exchanger 130, and the target side end unit 105, and in the non-air-conditioning state for the target site, the refrigerant circulates between the heat pump 120 and the refrigerant-water heat exchanger 130, and the cooled or heated water is stored in the heat storage tank 135, and in the air-conditioning state for the target site, the heat pump 120 and the heat storage tank 135 can supply cooling and heating to the target site, so that the power consumption required for normal operation can be reduced in order to improve the operation efficiency of the intelligent heat pump system 100.

Specifically, first, with the double heat exchange, it is possible to increase the coefficient of performance of the intelligent heat pump system 100 by lowering the condensation temperature during cooling of the heat pump 120 and raising the evaporation temperature during heating, thereby improving the performance of the intelligent heat pump system 100 and reducing the power consumption.

Second, with the double heat exchange, it is possible to realize the summer cold storage or the winter heat storage during an extra non-air-conditioned time period such as nighttime, non-operation time, and so on, thereby reducing the power consumption of the intelligent heat pump system 100 in the normal operation and enabling the demand management of the building or the power network through the reduction in the peak power, and preventing the blackout due to the power peak.

Third, even if the capacity of the heat storage tank 135 can be held only for about 1 hour to 3 hours per day, it is possible to efficiently operate the intelligent heat pump system 100 through intensive use of the heat storage tank 135 at peak times of summer and winter.

Fourth, when the geothermal heat conductivity or the like is low so that the amount of heat exchange in the ground becomes insufficient, cold water (summer season) or warm water (winter season) in the heat storage tank 135 can assist such situations. Thus, the number of the geothermal drilling holes or the size of the heat source side heat exchange member 110 can be greatly reduced, thereby reducing the installation and operation costs of the intelligent heat pump system 100.

Hereinafter, an intelligent heat pump system having a dual heat exchanger structure according to a second exemplary embodiment will be described with reference to the drawings. In the following, descriptions of some features will be omitted, when they are identical to those of the above-described first exemplary embodiment.

Figure 4:
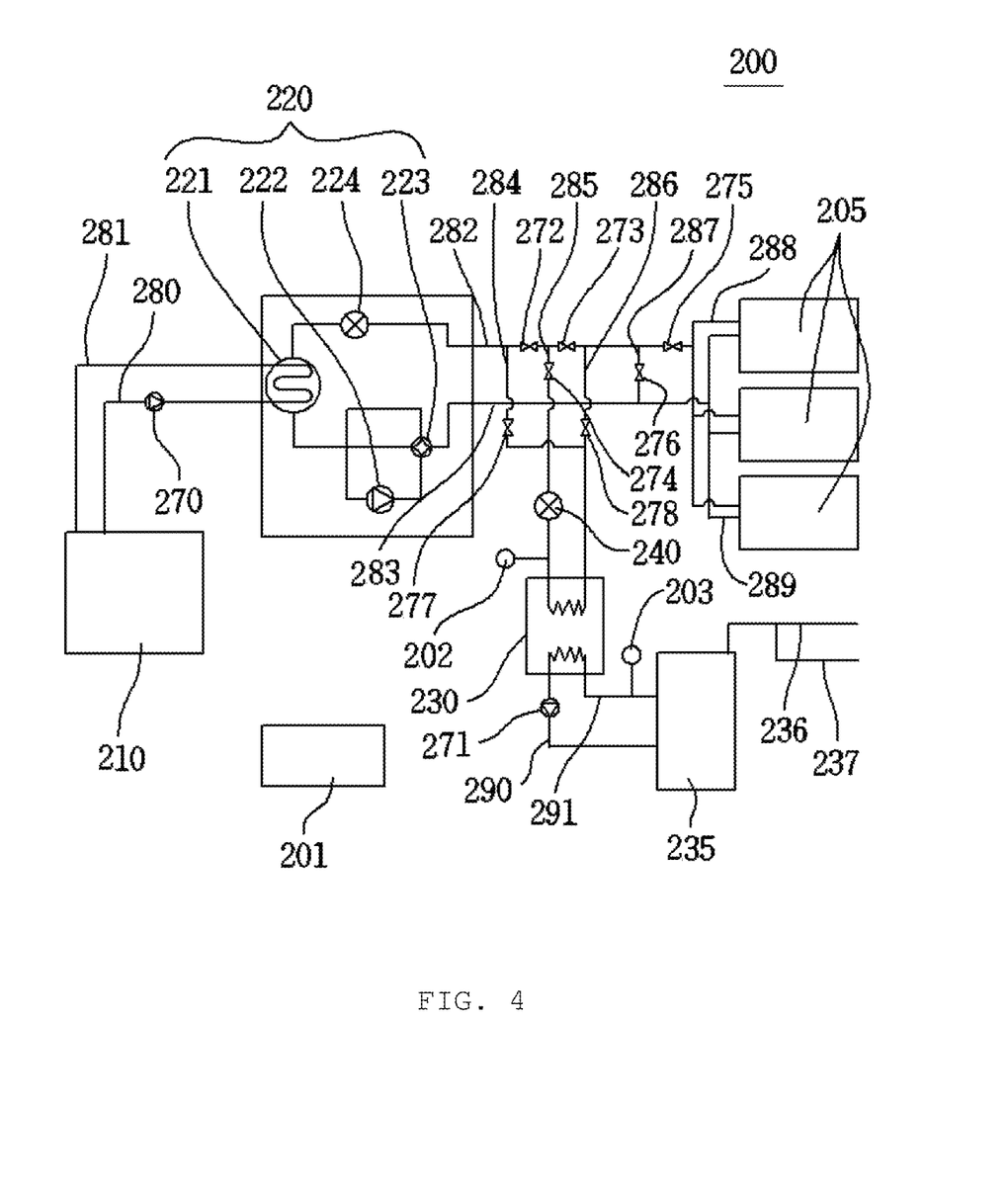
FIG. 4 is a view illustrating a configuration of an intelligent heat pump system having a dual heat exchanger structure according to a second exemplary embodiment.

FIG. 4 is a view illustrating a configuration of an intelligent heat pump system having a dual heat exchanger structure according to a second exemplary embodiment.

Referring to FIG. 4, in the present embodiment, a heat source side heat exchange member 210 is illustrated as an underground heat exchange member embedded in the ground so as to exchange heat with the ground, wherein the heat source side heat exchange member 210 is illustrated as an open type.

Here, the open type heat exchange member means a heat exchange member in which the heat exchange water directly flows into the ground and exchanges heat with the water in the ground while being mixed therewith.

Hereinafter, an intelligent heat pump system having a dual heat exchanger structure according to a third exemplary embodiment will be described with reference to the drawings. In the following, descriptions of some features will be omitted, when they are identical to those of the above-described first and second embodiments of the present disclosure.

Figure 5:
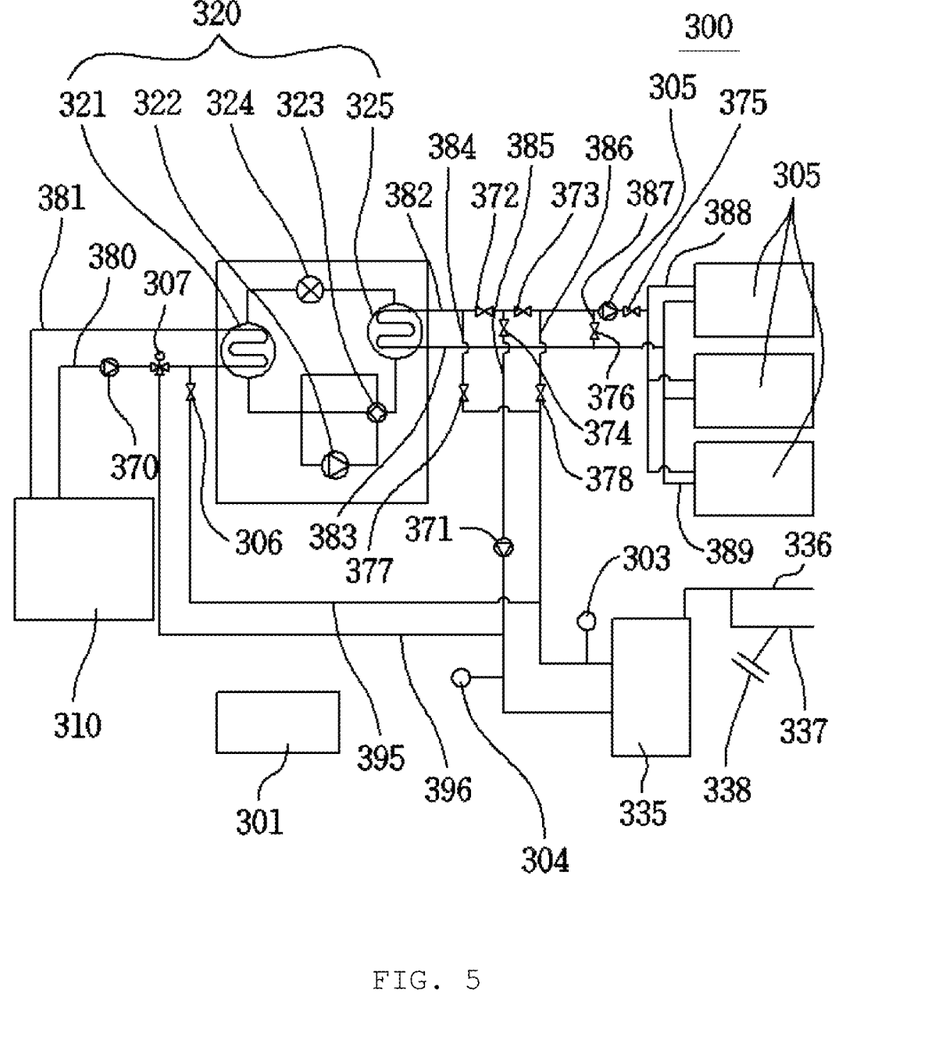
FIG. 5 is a view illustrating a configuration of an intelligent heat pump system having a dual heat exchanger structure according to a third exemplary embodiment.

FIG. 5 is a view illustrating a configuration of an intelligent heat pump system having a dual heat exchanger structure according to a third exemplary embodiment.

Referring to FIG. 5, the intelligent heat pump system 300 according to the present embodiment includes a heat source side heat exchange member 310, a heat pump 320, a heat storage tank 335, a heat storage supply piping 396, a heat storage reduction piping 395, and a target side end unit 305.

The heat pump 320 may exchange heat with a refrigerant while the heat exchange water, which exchanged heat with a heat source, e.g. the ground, through the heat source side heat exchange member 310, is passing therethrough. The heat pump 320 may operate in a cooling operation mode or a heating operation mode. The refrigerant circulates within the heat pump 320 by closed circulation.

In detail, the heat pump 320 further includes a load side heat exchanger 325, in addition to the heat source side heat exchanger 321, the compressor 322, the internal expansion valve 324, and the four-way valve 323, which are already described in the above embodiments.

The load side heat exchanger 325 is disposed on the side of the heat storage tank 335 and the target side end unit 305 to allow water flowing between the heat storage tank 335 and at least one of the target side end units 305 to exchange heat with the refrigerant flowing through the heat pump 320.

In the case where the heat pump 320 is operated in the cooling operation mode, the heat source side heat exchanger 321 functions as a condenser and the load side heat exchanger 325 functions as an evaporator so that the four-way valve 323 allows the refrigerant to flow sequentially through the compressor 322, the heat source side heat exchanger 321, the internal expansion valve 324, and the load side heat exchanger 325.

In contrast, in the case where the heat pump 320 is operated in the heating operation mode, the heat source side heat exchanger 321 functions as an evaporator and the load side heat exchanger 325 functions as a condenser so that the four-way valve 323 allows the refrigerant to flow sequentially through the load side heat exchanger 325, the internal expansion valve 324, the heat source side heat exchanger 321, and the compressor 322.

In the present embodiment, the inner extension piping 382 extends from the load side heat exchanger 325 of the heat pump 320 toward the target side end unit 305, and the water-returning connection piping 383 extends from the target side water-returning piping 389 and is connected to the load side heat exchanger 325 of the heat pump 320.

The heat storage tank 335 stores water to exchange heat with the refrigerant while the water passes through the heat pump 320.

In the present embodiment, a heat exchange branch piping 385 branches from the inner extension piping 382 to extend to the heat storage tank 335, and a heat storage pump 371 is installed on the branch piping 385.

In the present embodiment, a heat exchange joint piping 386 extends from the heat storage tank 335 and is joined to the inner extension piping 382.

The heat storage pump 371 is installed on the branch piping 385 so that the water flows into the heat storage tank 335 through the branch piping 385 and the water flows out of the heat storage tank 335 through the heat exchange joint piping 386.

Reference numeral 304 denotes a temperature sensor which senses the temperature of water flowing into the heat storage tank 335 along the branch piping 385. Reference numeral 303 denotes a temperature sensor which senses the temperature of water flowing out of the heat storage tank 335 along the heat exchange joint piping 386.

Reference numeral 305 denotes a supply pump which is installed between a bride piping 387 and a target side supply piping 388 in the inner extension piping 382 to allow the water to flow into the target side end unit 305 through the inner extension piping 382.

The heat storage supply piping 396 is piping that branches from the heat source supply piping 380 and is joined to the branch piping 385 to allow the heat exchange water directed from the heat source side heat exchange member 310 toward the heat source side heat exchanger 321 of the heat pump 320 to flow into the heat storage tank 335 through the branch piping 385.

The heat storage reduction piping 395 is piping that branches from the heat exchange joint piping 386 and is connected to a portion of the heat source supply piping 380 between the point where the heat storage supply piping 396 is connected and the heat source side heat exchanger 321 to allow the heat exchange water flowing into the heat storage tank 335 through the heat storage supply piping 396 to be directed to the heat source side heat exchanger 321 of the heat pump 320.

Reference numeral 307 denotes a three-way valve installed at a branch point between the heat storage supply piping 396 and the heat source supply piping 380. Reference numeral 306 denotes an underground opening/closing valve for opening and closing the heat storage reduction piping 395.

Except for the above, in the present embodiment, various pipes and various opening/closing valves already described in the above embodiments may be applied as they are, a flowing medium is not the refrigerant, but water, and the external expansion valve provided in the former embodiments is excluded.

In addition, since the heat exchange water is mixed with the water stored in the heat storage tank 335, the heat exchange water and the water are the same in the present embodiment, so even if the terms are used together, the terms indicate the same material.

In the present embodiment, in a non-air-conditioning state for the target site, the water, which was stored in the heat storage tank 335, is cooled or heated while being circulated between the heat storage tank 335 and the heat pump 320, and the cooled or heated water is stored in the storage tank 335, whereas in an air-conditioning state for the target site, the water exchanges heat with the refrigerant while passing through the heat pump 320 in a first heat-exchanging state in the heat source side heat exchange member 310 and the second heat-exchanging state in the heat storage tank 335, and the refrigerant, which exchanged heat with the water, exchanges heat with the water flowing between the heat pump 320 and the target side end unit 305 after flowing along the inside of the heat pump 320, thereby providing cooling and heating functions to the target site.

Hereinafter, the operation of the intelligent heat pump system 300 having the dual heat exchanger structure according to the present embodiment will be described in detail with reference to the drawings.

First, the cold storage operation of the heat pump system 300 will be described.

If the heat pump 320 is in the cooling operation mode and in the non-air-conditioning state for the target site, the cold storage operation is performed. In this case, the opening/closing valve 372 is opened, the opening/closing valve 373 is closed, the opening/closing valve 375 is closed, the opening/closing valve 376 is opened, the opening/closing valve 374 is opened, the opening/closing valve 378 is opened, the opening/closing valve 377 is closed, the three-way valve 307 closes the heat storage supply piping 396 side, and the opening/closing valve 306 is closed.

In this state, when the heat source pump 370 and the heat storage pump 371 are operated and the supply pump 305 is interrupted, the water flowed out of the heat storage tank 335 flows through the heat exchange joint piping 386, the inner extension piping 382, the bridge piping 387 and the water-returning connection piping 383, loses heat and is cooled through the heat exchange with the refrigerant while passing through the load side heat exchanger 325, and flows into the heat storage tank 335 through the inner extension piping 382 and the branch piping 385, so that the cooled water is accumulated in the heat storage tank 335 during the circulation of the water, thereby providing the cold storage operation.

In addition, the refrigerant heated from the load side heat exchanger 325 exchanges heat with the heat exchange water in the heat source side heat exchanger 321, so that the heat exchange water flows through the heat source reduction piping 381 in a heated state and loses heat through heat exchange with the ground, and flows again into the heat pump 320 through the heat source supply piping 380, thereby providing the circulation of the heat exchange water.

Hereinafter, the cold air supply operation in the intelligent heat pump system 300 will be described.

When the heat pump 120 is in the cooling operation mode and in the air-conditioning state for the target site, the cooling operation proceeds. In this case, the opening/closing valve 372 is opened, the opening/closing valve 373 is closed, the opening/closing valve 375 is opened, the opening/closing valve 376 is closed, the opening/closing valve 374 is closed, the opening/closing valve 378 is closed, the opening/closing valve 377 is closed, the three-way valve 307 closes the heat source side heat exchanger 321 side, and the opening/closing valve 306 is opened.

In this state, when the heat source pump 370 and the supply pump 305 are operated and the heat storage pump 371 is interrupted, with the water circulated between the load side heat exchanger 325 and the target side end unit 305 through the internal extension piping 382, the target side supply piping 388, the target side water-returning piping 389, and the water-returning connection piping 383, heat of the target site is transferred to the refrigerant flowing through the load side heat exchanger 325, thereby providing the cooling to the target site.

In addition, the water, which flowed through the joint piping 386 and the heat storage reduction piping 395 after being stored in the heat storage tank 335, is heated through the heat exchange with the refrigerant heated as described above while passing through the heat source side heat exchanger 321, and flows into the heat source side heat exchange member 310 through the heat source reduction piping 381 and exchanges heat with the ground in the heat source side heat exchange member 310, thereby primarily discharging heat.

The water that has primarily discharged the heat flows again into the heat storage tank 335 through the heat source supply piping 380, the three-way valve 307, the heat storage supply piping 396, and the branch piping 385 and is mixed with the cooled water stored in the heat storage tank 335 to secondarily discharge heat, so that the water circulates to perform the cold air supply operation.

In addition, the controller 301 automatically turns on/off each of the opening/closing valves, the expansion valves, and the like. Further, the controller also compares the temperature T1 of the water flowing into the heat storage tank 335, which is sensed by the temperature sensor 304, and the temperature T2 of the water flowing out of the heat storage tank 335, which is sensed by a temperature sensor 303, and if "T1≤T2+α" (where α is a cooling correction value for correcting measurement deviation, summer heat acquisition, uneven flowing or the like), returns the operation to a normal operation, that is, the operation that does not use the water in the storage tank 335. In such a condition, the cooling effect of the water in the storage tank 335 is eliminated. Then, the water, i.e. the heat exchange water, repeatedly flows through the heat source side heat exchange member 310 and the heat source side heat exchanger 321, thereby forming a conventional short flow cycle.

Here, in the three-way valve 307, the heat source side heat exchanger 321 side is opened, the heat storage supply piping 396 side is closed, and the underground heat storage reduction opening/closing valve 306 is closed.

Hereinafter, the heat storage operation of the heat pump system 300 will be described.

If the heat pump 320 is in the heating operation mode and in the non-air-conditioning state for the target site, the heat storage operation is performed. In this case, the opening/closing valve 372 is closed, the opening/closing valve 373 is opened, the opening/closing valve 375 is closed, the opening/closing valve 376 is opened, the opening/closing valve 374 is opened, the opening/closing valve 378 is closed, the opening/closing valve 377 is opened, the three-way valve 307 closes the heat storage supply piping 396 side, and the opening/closing valve 306 is closed.

In this state, when the heat source pump 370 and the heat storage pump 371 are operated and the supply pump 305 is interrupted, the water flowing out of the heat storage tank 335 flows through the heat exchange joint piping 386, the joint piping 384, and the inner extension piping 382 and then is heated through heat exchanges with the refrigerant while passing through the load side heat exchanger 325, and flows into the heat storage tank 335 through the water-returning connection piping 383, the bridge piping 387, the inner extension piping 382 and the branch piping 385, so that the heated water is accumulated in the heat storage tank 335 while the water circulates, thereby performing the heat storage operation.

In addition, the refrigerant that has lost heat in the load side heat exchanger 325 obtains heat through heat exchange with the heat exchange water in the heat source side heat exchanger 321, so that the heat exchange water flows through the heat exchange reduction piping 381 in a heat-lost state and then obtains heat through heat exchange with the ground at the heat source side heat exchange member 310 and flows again into the heat pump 320 through the heat source supply piping 380 in such a state, thereby allowing the circulation of the heat exchange water.

Hereinafter, the heat supply operation of the intelligent heat pump system 300 will be described.

When the heat pump 320 is in the heating operation mode and in the air-conditioning state for the target site, the heat supply operation proceeds. In this case, the opening/closing valve 372 is opened, the opening/closing valve 373 is opened, the opening/closing valve 375 is opened, the opening/closing valve 376 is closed, the opening/closing valve 374 is closed, the opening/closing valve 378 is closed, the opening/closing valve 377 is closed, the three-way valve 307 closes the heat source side heat exchanger 321, and the opening/closing valve 306 is opened.

In this state, when the heat source pump 370 and the supply pump 305 are operated and the heat storage pump 371 is interrupted, with the water circulated between the load side heat exchanger 325 and the target side end unit 305 through the internal extension piping 382, the target side supply piping 388, the target side water-returning piping 389, and the water-returning connection piping 383, heat of the water is transferred to the target site, and the water obtains the heat of the refrigerant while passing through the load side heat exchanger 325, thereby providing the heating to the target site.

In addition, the water, which flowed through the joint piping 386 and the heat storage reduction piping 395 after being stored in the heat storage tank 335, loses heat through the heat exchange with the refrigerant, which has lost heat as described above, while passing through the heat source side heat exchanger 321, and flows into the heat source side heat exchange member 310 through the heat source reduction piping 381 and exchanges heat with the ground in the heat source side heat exchange member 310, thereby primarily absorbing heat.

The water that has primarily absorbed the heat flows again into the heat storage tank 335 through the heat source supply piping 380, the three-way valve 307, the heat storage supply piping 396, and the branch piping 385 and is mixed with the heated water stored in the heat storage tank 335 to secondarily absorb heat, so that the water circulates to perform the heat supply operation.

In addition, the controller 301 automatically turns on/off each of the opening/closing valves, the expansion valves, and the like. Further, the controller also compares the temperature T1 of the water flowing into the heat storage tank 335, which is sensed by the temperature sensor 304, and the temperature T2 of the water flowing out of the heat storage tank 335, which is sensed by a temperature sensor 303, and if "T1≥T2+β" (where β is the heating correction value for correcting measurement deviation, winter heat loss, uneven flowing or the like) returns the operation to a normal operation, that is, the operation that does not use the water in the storage tank 335. In such a condition, the heating effect of the water in the storage tank 335 is eliminated. Then, the water, i.e. the heat exchange water, repeatedly flows through the heat source side heat exchange member 310 and the heat source side heat exchanger 321, thereby forming a conventional short flow cycle.

Here, in the three-way valve 307, the heat source side heat exchanger 321 side is opened, the heat storage supply piping 396 side is closed, and the underground heat storage reduction opening/closing valve 306 is closed.

In the present embodiment, the water stored in the heat storage tank 335 is discharged directly to the target side end unit 305 in a state where in the non-air-conditioning state for the target site, and the heat pump 320 is not operated, which will be described in detail below.

When the heat pump 320 is in an interrupted state and is not air-conditioned with respect to the target site, the water stored in the heat storage tank 335 may be supplied directly to the target side end unit 305. In this case, the opening/closing valve 372 is opened, the opening/closing valve 373 is closed, the opening/closing valve 375 is opened, the opening/closing valve 376 is closed, the opening/closing valve 374 is opened, the opening/closing valve 378 is opened, the opening/closing valve 377 is closed, the three-way valve 307 closes the heat storage supply piping 396 side, and the opening/closing valve 306 is closed.

In this state, when the heat source pump 370 is interrupted and the heat storage pump 371 and the supply pump 305 are operated, the water stored in the heat storage tank 335 flows into the target side end unit 305 through the heat exchange joint piping 386, the inner extension piping 382 and the target side supply pipe 388, so that the water stored in the heat storage tank 335 flows directly to the target side end unit 305, thereby facilitating water cooling and heating, supplying cool and hot water, or the like.

The water passed through the target side end unit 305 flows again into the heat storage tank 335 through the target side water-returning piping 389, the water-returning connection piping 383, the load side heat exchanger 325 (here, the water only flows therethrough without heat exchange between the refrigerant and the water), the inner extension pipe 382, and the branch piping 385, so that the water stored in the heat storage tank 335 may be supplied directly to the target site.

As described above, since the intelligent heat pump system 300 includes the heat source side heat exchange member 310, the heat pump 320, the heat storage tank 335, the heat storage supply piping 396, the heat storage reduction piping 395, and the target side end unit 305, in a non-air-conditioning state for the target site, the water, which was stored in the heat storage tank 335, is cooled or heated while being circulated between the heat storage tank 335 and the heat pump 320, and the cooled or heated water is stored in the storage tank 335, whereas in an air-conditioning state for the target site, the water exchanges heat with the refrigerant while passing through the heat pump 320 in a first heat-exchanging state in the heat source side heat exchange member 310 and the second heat-exchanging state in the heat storage tank 335, and the refrigerant, which exchanged heat with the water, exchanges heat with the water flowing between the heat pump 320 and the target side end unit 305 after flowing along the inside of the heat pump 320, thereby providing cooling and heating functions to the target site. Accordingly, it is possible to reduce the power consumption required for the normal operation in order to improve the operating efficiency of the intelligent heat pump system 300 having the dual heat exchanger structure. Further, even when the heat pump 320 is stopped, the supply pump 305 is operated so that the cooled or heated water stored in the heat storage tank 335 is transferred directly to the target site, thereby enabling cooling/heating supply, hot water supply, and the like to the target site.

Figure 6:
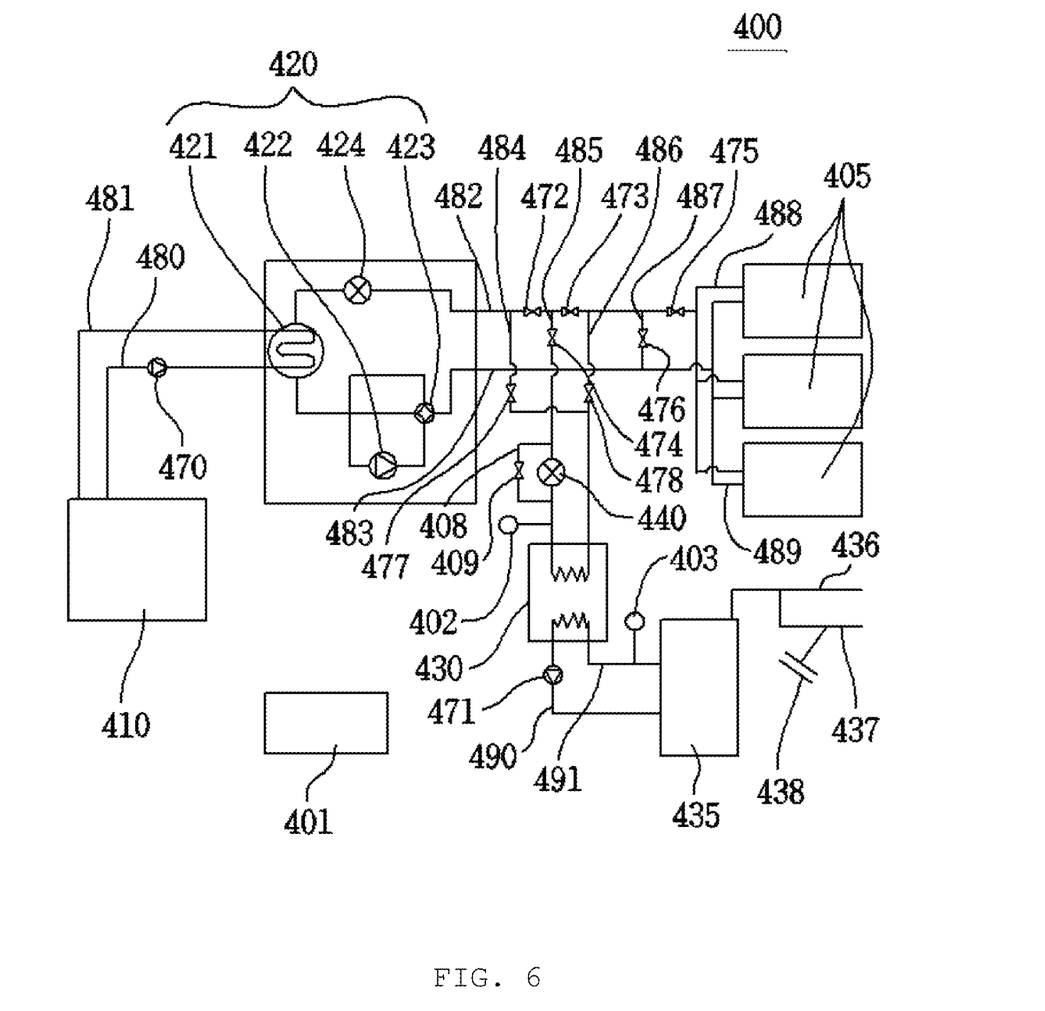
FIG. 6 is a view illustrating a configuration of an intelligent heat pump system having a dual heat exchanger structure according to a fourth exemplary embodiment.

FIG. 6 is a view illustrating a configuration of an intelligent heat pump system having a dual heat exchanger structure according to a fourth exemplary embodiment.

Referring to FIG. 6, the intelligent heat pump system 400 includes a bypass piping 408 connected in parallel with the external expansion valve 440.

Both ends of the bypass piping 408 are respectively connected to a front end and a rear end of the external expansion valve 440 in the branch piping 485, and the bypass piping 408 is provided with an opening/closing valve 409 for opening and closing the bypass piping 408.

In such a configuration, if the refrigerant does not require expansion in the external expansion valve 440, the opening/closing valve 409 is opened, the external expansion valve 440 is closed, so that the refrigerant flows through the bypass piping 408 bypassing the external expansion valve 440 and then flows to the refrigerant-water heat exchanger 430, thereby allowing the frictional loss occurring during the refrigerant passing through the fully opened external expansion valve 440 to be reduced.

According to the intelligent heat pump system having the dual heat exchanger structure according to one aspect of the present invention, it is possible to reduce the power consumption required for normal operation in order to improve the operating efficiency, so that the industrial applicability is high.

The foregoing descriptions of specific exemplary embodiments of the present disclosure have been presented with respect to the drawings and are not intended to be exhaustive or to limit the present disclosure to the precise forms disclosed, and obviously many modifications and variations are possible for a person having ordinary skill in the art in light of the above teachings. It is intended therefore that the scope of the present disclosure not be limited to the foregoing embodiments, but be defined by the Claims appended hereto and their equivalents.

What is claimed is:

1. A heat pump system having a dual heat exchanger structure, the heat pump system comprising:
   a heat source side heat exchange member exchanging heat with a heat source while heat exchange water flows;
   a heat pump exchanging heat with the heat exchange water, which exchanged heat with the heat source through the heat source side heat exchange member, and operating in a cooling operation mode or a heating operation mode;
   an external expansion valve disposed outside of the heat pump to allow a refrigerant passed through the heat pump to expand while passing therethrough;
   a refrigerant-water heat exchanger through which the refrigerant passed through the external expansion valve exchanges heat;
   a heat storage tank storing water to exchange heat with the refrigerant while the water passes through the refrigerant-water heat exchanger; and a target side end unit capable of providing cooling and heating to a target site depending on the operation mode of the heat pump, wherein the refrigerant is able to flow between the heat pump, the refrigerant-water heat exchanger, and the target side end unit, wherein, in a non-air-conditioning state for the target site, while the refrigerant is circulating between the heat pump and the refrigerant-water heat exchanger, the water is cooled or heated, and the cooled or heated water is stored in the heat storage tank, wherein the heat pump and the heat storage tank are able to supply cooling and heating to the target site in an air-conditioning state for the target site, wherein, when the heat pump is in the cooling operation mode and in a non-air-conditioning state for the target site, a cold storage operation is performed such that the refrigerant, which has lost heat through heat exchange with the heat exchange water in the heat pump, flows through the refrigerant-water heat exchanger in an expanded state while passing through the external expansion valve, the refrigerant flowing through the refrigerant-water heat exchanger flows again into the heat pump in a state of absorbing heat of the water flowing through the refrigerant-water heat exchanger, the heat exchange water absorbing the heat of the refrigerant in the heat pump flows again into the heat pump in a state of losing heat through heat exchange with the heat source in the heat source side heat exchange member, and the water is cooled through losing of heat to the refrigerant in the refrigerant-water heat exchanger and the cooled water is stored in the heat storage tank, and wherein, when the heat pump is in the cooling operation mode and in an air-conditioning state for the target site, a cold air supply operation is performed such that the refrigerant losing heat and primarily-condensed through heat exchange with the heat exchange water in the heat pump exchanges is secondarily condensed through heat exchange with the cooled water supplied from the heat storage tank while passing through the refrigerant-water heat exchanger, and the secondarily condensed refrigerant supplies cooling to the target site through the target side end unit.

2. The heat pump system according to claim 1, wherein, when the heat pump is in the heating operation mode and in a non-air-conditioning state for the target site, a heat storage operation is performed such that the refrigerant obtaining heat through heat exchange with the heat exchange water in the heat pump flows through the refrigerant-water heat exchanger, the refrigerant flowing through the refrigerant-water heat exchanger flows again into the heat pump in a state of losing heat to the water flowing through the refrigerant-water heat exchanger, the heat exchange water losing heat to the refrigerant in the heat pump flows again into the heat pump in a state of obtaining heat through heat exchange with the heat source in the heat source side heat exchange member, the water is heated by obtaining heat from the refrigerant in the refrigerant-water heat exchanger, and the heated water is stored in the heat storage tank, and wherein, when the heat pump is in the heating operation mode and in an air-conditioning state for the target site, a heat supply operation is performed such that the refrigerant primarily evaporated through heat exchange with the heated water supplied from the heat storage tank is secondarily evaporated by obtaining heat through heat exchange with the heat exchange water in the heat pump, and the secondarily evaporated refrigerant supplies heating to the target site through the target side end unit.

3. The heat pump system according to claim 2, wherein the heat pump system includes a bypass piping connected in parallel with the external expansion valve, wherein, if the refrigerant does not require expansion in the external expansion valve, the refrigerant flows through the bypass piping bypassing the external expansion valve and then flows to the refrigerant-water heat exchanger.

4. A heat pump system having a dual heat exchanger structure, the heat pump system comprising:

a heat source side heat exchange member exchanging heat with a heat source while heat exchange water flows;

a heat pump exchanging heat with the heat exchange water, which exchanged heat with the heat source through the heat source side heat exchange member, and operating in a cooling operation mode or a heating operation mode;

an external expansion valve disposed outside of the heat pump to allow a refrigerant passed through the heat pump to expand while passing therethrough;

a refrigerant-water heat exchanger through which the refrigerant passed through the external expansion valve exchanges heat;

a heat storage tank storing water to exchange heat with the refrigerant while the water passes through the refrigerant-water heat exchanger; and a target side end unit capable of providing cooling and heating to a target site depending on the operation mode of the heat pump, wherein the refrigerant is able to flow between the heat pump, the refrigerant-water heat exchanger, and the target side end unit, wherein, in a non-air-conditioning state for the target site, while the refrigerant is circulating between the heat pump and the refrigerant-water heat exchanger, the water is cooled or heated, and the cooled or heated water is stored in the heat storage tank, wherein the heat pump and the heat storage tank are able to supply cooling and heating to the target site in an air-conditioning state for the target site, wherein the heat pump system comprises:

a temperature sensor sensing the temperature of the refrigerant flowing into the refrigerant-water heat exchanger after passing through the external expansion valve;

a temperature sensor sensing the temperature of the water flowing into the refrigerant-water heat exchanger from the storage tank; and a controller capable of controlling the operation of each component of the heat pump system, wherein the controller compares the temperature (T1) of the refrigerant flowing into the refrigerant-water heat exchanger, which is sensed by the temperature sensor, and the temperature (T2) of the water flowing into the refrigerant-water heat exchanger from the heat storage tank, which is sensed by the temperature sensor, and if $T1 \leq T2+\alpha$, where $\alpha$ is a cooling correction value, or $T1 \geq T2+\beta$, where $\beta$ is a heating correction value, repeats a flow cycle of the refrigerant circulating between the heat pump and the target side end unit.

* * * * *